Dec. 8, 1931.  W. S. NICHOLS  1,834,964

LAWN MOWER

Filed Nov. 26, 1928  2 Sheets-Sheet 1

Inventor:
Winfield S. Nichols
By Wilson & McCanna
Attys.

Dec. 8, 1931. W. S. NICHOLS 1,834,964
LAWN MOWER
Filed Nov. 26, 1928 2 Sheets-Sheet 2
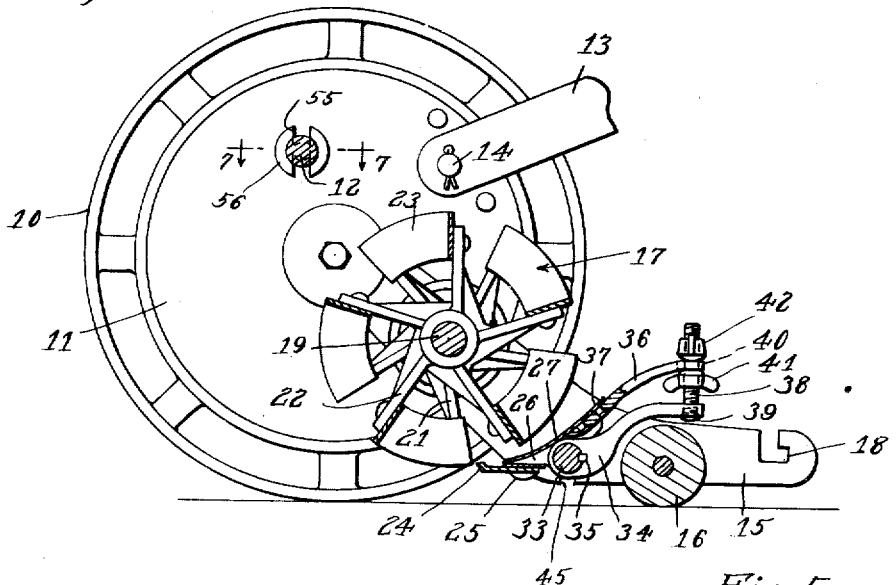
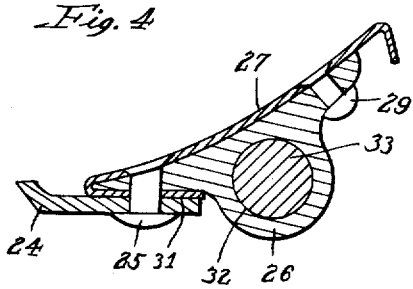
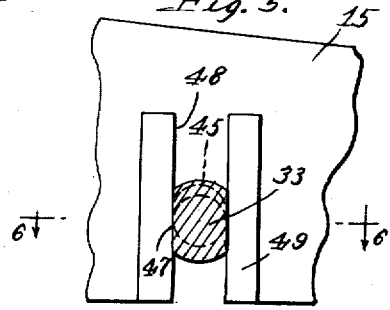
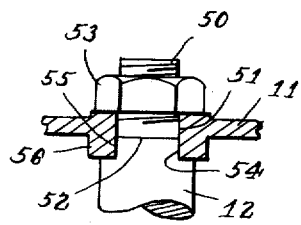
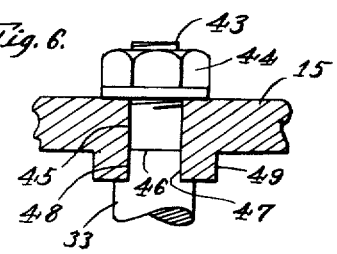
Inventor.
Winfield S. Nichols
By Wilson & McCanna
Attys.

Patented Dec. 8, 1931

1,834,964

UNITED STATES PATENT OFFICE

WINFIELD S. NICHOLS, OF ROCKFORD, ILLINOIS

LAWN MOWER

Application filed November 26, 1928. Serial No. 321,883.

This invention relates to lawn mowers.

In the manufacture of lawn mowers it is generally well recognized that one of the outstanding problems has been to devise an adjustable mounting for the cutter bar that will enable even a mechanically unskilled person to easily and quickly set the cutter bar in true alignment with the reel and with exactly the proper clearance for good cutting. Another great problem has been to provide a construction which will render the frame so sturdy and rigid that there will be no chance for the cutter bar to be thrown out of accurate alignment with the reel. My invention has for its principal object the provision of a lawn mower of a construction which meets these needs in a thoroughly practical way, the salient features being:

First, the provision in connection with the cutter bar of a cross rod fastened rigidly to the side frames in such a way that it may be adjusted bodily to bring the longitudinal axis for adjustment of the cutter bar into the proper plane, the said rod having the cutter bar mounted to fulcrum thereon for clearance adjustment through the medium of a plurality of longitudinally spaced bearings.

Second, the provision of a tie bar which, instead of being simply keyed to the side frames, which it has been found permits the same to get misaligned in the course of a short period of service, has flats milled on the ends thereof engaging the sides of slots formed on the side frames, in addition to being fastened thereto by the tightening of nuts threaded on the ends of said bar, thus insuring extreme rigidity in the frame which, as stated before, is of paramount importance in keeping the cutter bar aligned with the reel.

Another object of the invention is to provide the end spiders of the reel with circular flanges to fit over the bearing housings receiving the spider shaft, whereby positively to prevent the winding of grass between the reel and the bearings and keep the bearings free from dirt and water.

The invention is illustrated in the accompanying drawings wherein—

Fig. 3 is a cross-section on the line 3—3 of Fig. 1, showing the cutter bar clearance adjustment;

Fig. 4 is a transverse vertical section of the cutter bar taken through one of its bearings;

Fig. 5 is an enlarged fragmentary sectional detail on the line 5—5 of Fig. 2 showing the fastening of the cross rod, forming the cutter bar support, to the side frames;

Fig. 6 is a horizontal section on the line 6—6 of Fig. 5, and

Fig. 7 is an enlarged fragmentary sectional detail on the line 7—7 of Fig. 3 showing the attachment of the tie bar to the side frames.

The same reference numerals are applied to corresponding parts throughout the views.

Figure 1:
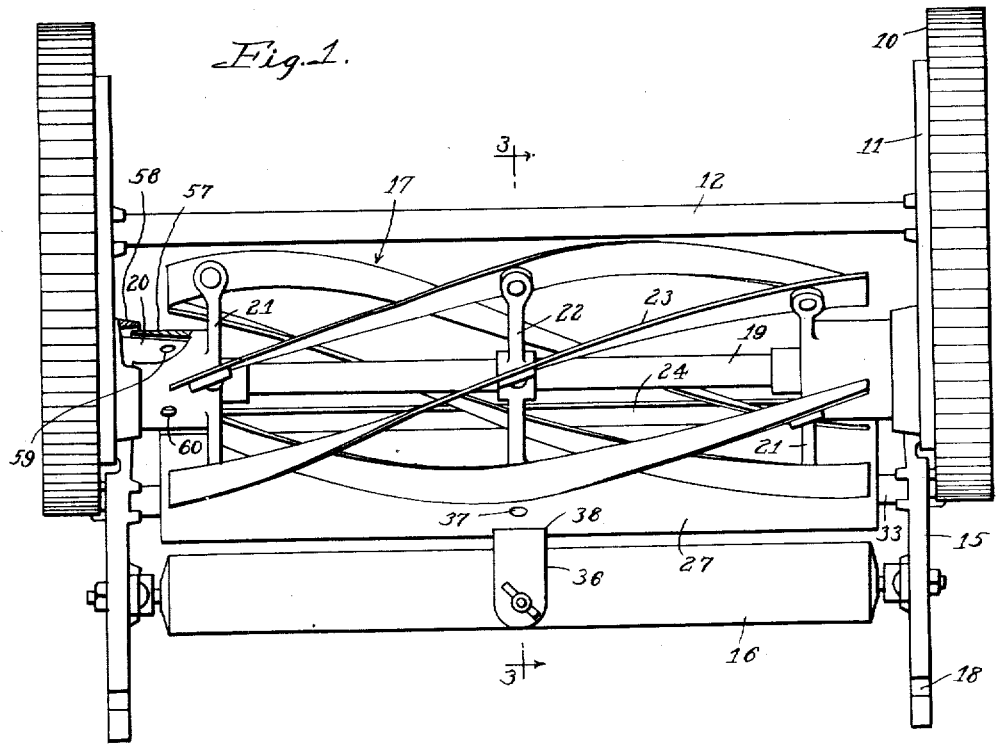
Figure 1 is a plan view of a lawn mover embodying my improvements.

The lawn mower illustrated is of generally conventional design having drive wheels 10 mounted in a usual way on side frames 11. The latter are fastened together by a tie bar 12, often referred to as the brush bar, and have the fork 13 of the operating handle pivoted thereto at 14. Bracket portions 15 are cast preferably integral with the side frames 11, a wooden ground roller 16 being suitably mounted thereon near the free ends thereof, appreciably to the rear of the reel 17. The bayonet slots 18 in the free ends of the bracket portions 15 are for the purpose of attaching the grass catcher to the lawn mower. So much for a general description of the lawn mower in connection with which I have chosen to illustrate my improvements.

Figure 2:
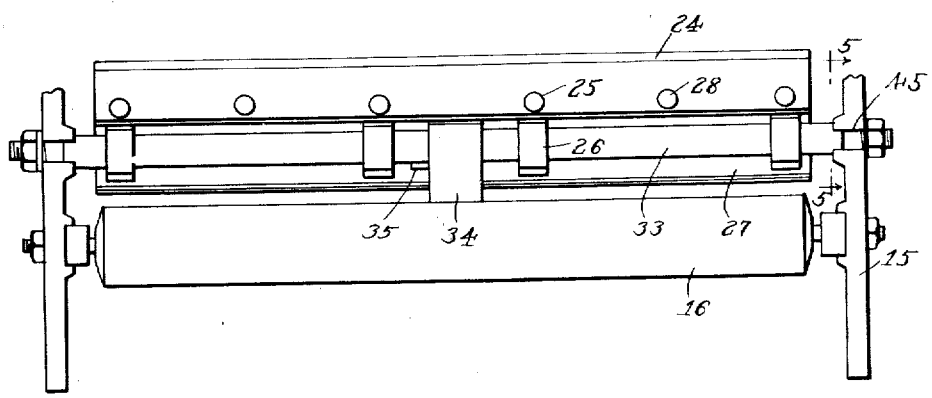
Fig. 2 is an underside view of a portion of Fig. 1 to show the cutter bar mounting.

The reel 17 has the shaft 19 thereof received in suitable anti-friction bearings 20 on the side frames 11, there being pinions mounted on the free ends thereof (not shown) meshing with internal gears in the wheels 10 and arranged to transmit the drive from the wheels to the reel through overrunning clutches in a well known manner. End spiders 21 and middle spider 22 mounted on the shaft 19 have the usual curved blades 23 mounted on the free ends of the arms thereof. These blades are arranged to cooperate with a straight edged cutter bar 24. The latter is riveted or otherwise suitably secured, as shown at 25, to a plurality of bearing brackets 26 spaced longitudinally relative thereto (see Fig. 2). A curved shield 27, suitably of a galvanized copper alloy steel, covers the brackets 26 and is fastened with the cutter bar 24 thereto by the rivets with the cutter bar 24 thereto by the rivets 25, there being additional rivets 28 at points intermediate the brackets 26 for fastening the shield to the cutter bar, and still other rivets 29 for fastening the rear edge of the shield to the brackets. The shield 27 has the rear edge thereof bent downwardly in the form of a flange to afford reinforcement therefor and so as not to present any exposed raw edges. The front edge of the shield, it will also be noted, is bent rearwardly, as at 31, to fit under the front ends of the brackets 26 and be held between the latter and the cutter bar in the riveting of the cutter bar thereto. This also affords a certain amount of reinforcement and avoids exposed raw edges. The brackets 26 are preferably of brass to prevent rusting and have bearing holes 32 provided therein for the reception of a cross rod 33 mounted, as will presently appear, in the bracket portions 15 of the side frames 11 in such a way that the same is held rigidly against turning and against displacement from true parallelism with the shaft 19 and tie bar 12, to the end that the cutter bar 24 is maintained in precise alignment with reference to the blades 23 of the reel 17, as required for fast, easy cutting. The cross rod 33 has the enlarged end of a radius arm 34 mounted thereon and held rigid therewith by a key 35. The arm 34 reaches rearwardly and is curved upwardly to clear the roller 16 (see Fig. 3). Another radius arm 36 is made rigid with the cutter bar 24 by fastening the same to the underside of the shield 27, as by means of rivets 37, the flange 30 being cut away, as indicated at 38, to accommodate the arm 36, as shown in Fig. 1. The arm 36, as best appears in Figs. 3 and 4, extends rearwardly and overlies the arm 34. The free end of the latter has a stud 38 mounted thereon and extending upwardly therefrom, the same being suitably threaded in the arm 34 and having its lower end upset, as indicated at 39, to keep the same from turning. The stud 38 passes through a slot 40 provided in the free end of the arm 36 and has a wing nut 41 threaded thereon beneath said arm and another wing nut 42 threaded thereon above the same. These wing nuts are arranged to hold the arm 36 firmly in adjusted, angular relation to the arm 34, such angular relationship being arranged to be changed by simply backing the nut 41 away from the arm 36 a desired amount and then tightening the nut 42, that is, in the event that it is desired to bring the cutter bar 24 closer to the blades 23 of the reel 17. If the cutter bar 24 is too close to the reel so that the latter does not turn as easily as it should, the nut 42 should be backed away from the arm 36 a slight amount to secure the desired clearance and then the nut 41 should be tightened. Obviously, if too much adjustment is gotten on the first trial, it may be compensated for by a slight adjustment in the opposite direction until precisely the desired clearance adjustment is secured. With this single point adjustment for the cutter bar the user can easily adjust the lawn mower himself and that very quickly, as there is no multiplicity of screws to be bothered with. The cutter bar, furthermore, is bound to keep its adjusted position. In many lawn mowers heretofore available where the cutter bar had a two-point adjustment, for example at opposite ends thereof, it was an extremely difficult proposition for the average person to make a satisfactory adjustment; the cutter bar would usually meet the reel only at the middle or only at one end and could only be brought into full alignment by painstaking and laborious adjustment. Certain lawn mowers provided with a one-point adjustment for the cutter bar were subject to various other practical disadvantages, the principal one being that the adjusting means usually imposed such a strain on the cutter bar that the same was apt to bind at the point of adjustment when the rest of the cutter bar was adjusted into proper relation to the reel. The adjustment herein provided, it will be seen, avoids the difficulties referred to, and renders the cutter bar easily and quickly adjustable without imposing any distorting strain thereon whatever which might in any way interfere with the efficient cooperation of the cutter bar with the reel. Furthermore, these prior one-point adjustments for the cutter bar were invariably more or less complicated and expensive in construction and some were also objectionable because they tended to catch grass thereon. In the present case, the parts providing the one-point adjustment are protected by the shield 27 from grass catching thereon and are still disposed very conveniently for manipulation.

It is important, as stated above, to keep the cross rod 33 absolutely rigid and in a plane in true parallelism with the planes of the reel shaft 19 and tie bar 12. With this object in mind I have provided a special mounting therefor. The rod 33 is of appreciable diameter so as to resist any tendency to twist or give under the slight amount of stress imposed thereon by the arm 34 in the adjustment of the cutter bar. The ends of the rod are reduced and threaded, as shown at 43, to receive nuts 44 when the ends of the rod are passed through slots 45 provided therefor in the bracket portions 15 of the side frames 11. The annular shoulders 46 formed at the ends of the rod 33, as a result of the reduction in diameter of the extremities of said rod, are arranged to bear against the inner faces of the side frames when the nuts 44 are tightened and there is, therefore, no distortion of the side frames. Immediately adjacent the shoulders 46, the ends of the rods 33 are milled off on opposite sides to form flats 47 arranged for snug engagement with the sides of a slot 48 formed by milling between parallel bosses 49 preferably cast integral with the bracket portions 15 of the side frames 11. Thus the rod 33 is held positively against turning. Now, it would obviously be practically impossible to provide holes in such accurate location that the rod 33, when its ends were inserted therein, would be held absolutely parallel with the reel shaft 19 and tie bar 12. For this reason the slots 45 are provided. The latter are preferably open at the lower edges of the bracket portions 15 to permit the disassembling of the rod 33 as, for example, when the cutter bar 24 is to be sharpened. These slots also permit the rod 33 to be brought into parallelism with the shaft 19 before the nuts 44 are tightened to hold it in such position. In the setting of the rod 33 I find that it is a very simple matter if the lawn mower is turned over so that the parts occupy the position indicated in Fig. 2, and then, assuming that the nuts 44 are left loose so that they will permit jogging of the rod one way or another into proper position, the rod can be accurately aligned by simply turning the reel to such a position where the cutter bar can rest at one end on one end of one of the blades 23 and at its other end on the opposite end of the next blade, following which the nuts 44 can be tightened with definite assurance that the cross rod 33 is then as close to parallelism with the shaft 19 as it is physically possible to get it. After setting the cross rod 33 in this manner, the cutter bar 24 can be adjusted and set by means of the wing nuts 41 and 42 as previously described so that there is just the right amount of clearance between the cutter bar and the blades for efficient operation of the lawn mower. The blades 23 are, of course, arranged to be sharpened in place in the mower in the usual way, but when the cutter bar requires sharpening it is necessary to remove the same, and it is in the reassembling of the mower that the ease with which the rod 33 can be aligned with reference to the shaft 19 is fully appreciated; the average mechanically unskilled person will experience no difficulty whatever in doing this.

Referring now to the tie bar 12, as previously stated, the maintaining of the cutter bar in accurate alignment with the reel depends largely upon rigidity of the frame. In lawn mowers heretofore available, the tie bar connecting the side frames was usually simply keyed in place to keep the side frames from turning relative thereto. This sort of construction gave rise to much trouble because the frame would not remain rigid after being in service for a while and the wobbliness of the frame naturally interfered with the cutting by throwing the cutter bar out of line with the reel. It was also attempted to rigidify the frame by the use of more than one tie bar, one in front of the reel and one behind the same. The trouble with that sort of construction was that it meant added weight, extra cost, and interference with the easy operation of the mower by introducing another part in a place where grass would catch on it. According to my invention the tie bar 12 is fastened to the side frames 11 in such a way that there is no danger of the frames getting wobbly. This bar, like the rod 33, has the ends thereof reduced and threaded, as shown at 50, and arranged to have a fairly close fit in holes 51 provided in the side frames. An annular shoulder 52 is thus formed at each end of the bar 12 arranged to engage the inner face of each of the side frames and hold said frames in parallel relation to one another when the nuts 53 threading on the reduced ends 50 are tightened. Immediately adjacent the annular shoulder 52 at each end, the bar is milled on opposite sides to provide flats 54 arranged for snug engagement with the opposite sides of a slot 55 formed by milling between parallel bosses 56 preferably cast integral with the side frames. This dovetail or slot and tenon connection between the tie bar and the side frames positively prevents any chance of the frame becoming wobbly; there is a sufficient cross section on the tie bar to assume the strains imposed thereon by the frames in operation so that there is no chance of the side frames working loose. Thus, the one tie bar is virtually all that is needed to keep the frame absolutely rigid. However, it will be evident that there is also a certain cooperation between the cross rod 33 and the tie bar 12; each is interlocked with the side frames in a way preventing turning of the side frames relative thereto, and is furthermore provided with shoulders to bear against the inner faces of the side frames when the nuts thereon are tightened, thus tending to hold the side frames in parallel relation to one another. The cross rod 33, in other words, serves a double function; it serves as a fulcrum for the cutter bar and takes the place of an extra tie bar which, in some other constructions, has heretofore been considered necessary.

Referring to Fig. 1, it will be observed that I have provided on the hub of each of the two end spiders 21 of the reel 17 a circular flange 57 to fit over the outside of the adjacent bearing 20 and thus protect the bearing against ingress of dirt and water, and also avoid any danger of the winding of grass about the reel shaft 19 between the spider and the bearing and placing a drag on the operation of the reel. As further protection, I may also provide a circular flange 58 on each of the side frames concentric with the bearing 20 to enclose the marginal portion of the circular flange 57. Lubrication of the bearings 20 may, of course, be taken care of in any preferred manner, although I have shown the well known form of spring oil cup 59 on the bearing to which oil is arranged to be supplied suitably through a hole 60 provided in the circular flange 57 by simply turning the reel to a point where the hole registers with the oil cup. Caps may be provided for the holes 60, if desired.

It is believed the foregoing description conveys a clear understanding of all of the objects and advantages of my invention. The appended claims have been drawn to afford protection commensurate with these improvements.

I claim:

1. In a lawn mower, the combination with side frames, and a reel mounted in the side frames, of a cross rod mounted on and extending between the side frames substantially in parallel relation to said reel, said rod being held against turning relative to said side frames, a cutter bar supported by and fulcrumed on the cross rod whereby the same is held in alignment with the reel and is arranged for adjustment relative thereto for the desired clearance while maintaining parallelism therewith, a radius arm fixed on said cross rod, another radius arm fixed to the cutter bar and extending in angular relation to the first radius arm, and means for adjusting the second arm angularly relative to the first arm and holding the same in adjusted position.

2. A lawn mower as set forth in claim 1 wherein the ends of said cross rod are received in substantially vertical slots provided in the side frames, whereby the rod may be adjusted bodily in one plane parallel with the reel, and including means for fastening the rod in adjusted position in the slots, said cutter bar being arranged by adjustment toward engagement with the reel itself before the fastening of said rod to cause adjustment of the same in a transverse plane to a position of absolute or universal parallelism with the reel.

3. In a lawn mower as set forth in claim 1 wherein the cross rod serves as a tie bar extending between the side frames on one side of the reel holding the side frames against turning relative to one another, a tie bar extending between the side frames on the opposite side of the reel parallel with said cross rod and having means for fastening the same to the side frames in such a way that said bar is held against turning relative to either side frame and the side frames are therefore held against turning relative to one another.

4. In a lawn mower, the combination with side frames, a reel mounted in the side frames, and a roller mounted on the side frames behind and in spaced parallel relation to the reel, of a cross rod mounted on the side frames behind the reel but in front of the roller and substantially in parallel relation thereto, a cutter bar supported by and fulcrumed on the cross rod whereby the same is held in alignment with the reel and is arranged for adjustment relative thereto for the desired clearance while maintaining parallelism therewith, a radius arm fixed on the cross rod and extending rearwardly therefrom and upwardly over the roller, another radius arm fixed to and arranged to fulcrum with the cutter bar relative to the cross rod, the same extending rearwardly over the first mentioned arm and in angular relation therewith, and means cooperating with the free ends of said arms for adjusting the second arm angularly relative to the first arm and holding the same in adjusted position whereby to adjust the cutter bar relative to the reel.

5. A lawn mower as set forth in claim 4, including a shield extending from the cutter bar rearwardly over at least a portion of the radius arms whereby to protect the same as well as the roller from grass thrown by the reel, said shield having the rear edge thereof bent downwardly to form a reinforcing flange to make the shield rigid and thereby stiffen the cutter bar.

6. A lawn mower as set forth in claim 4, including a shield extending from the cutter bar rearwardly over at least a portion of the radius arm whereby to protect the same as well as the roller from grass thrown by the reel, said shield having the rear edge thereof bent downwardly to form a reinforcing flange to make the shield rigid and thereby stiffen the cutter bar, the second radius arm being fastened to the shield to provide connection for the radius arm with the cutter bar.

7. A lawn mower as set forth in claim 4 including a sheet metal shield fastened to the cutter bar and extending rearwardly therefrom for protection of the roller and radius arms from grass thrown by the reel, said shield having the rear edge thereof bent downwardly to form a reinforcing flange, the latter being cut away at one point, and the second radius arm being inserted at said point and fastened to said shield for connection with the cutter bar.

8. In a lawn mower, the combination with a pair of side frames, and a reel mounted in the side frames, of a cutter bar element fulcrumed on a fixed horizontal axis between the side frames for adjustment relative to the reel and in parallelism therewith, a cross rod element mounted in the side frames, a radius arm fixed to and extending from the cross rod element, another radius arm fixed to and extending from the cutter bar element, the said arms extending one above the other and having their free ends normally in fixed spaced relation, and means for turning one of the said elements relative to the other and holding the same in adjusted position whereby to adjust the relationship between the cutter bar and the reel while maintaining the parallelism therebetween.

9. In a lawn mower, the combination with a pair of side frames, and a reel mounted in the side frames, of a cross rod mounted in the side frames in parallel relation to the reel and positively held against turning, a cutter bar arranged to be supported and fulcrumed on the cross rod, said bar having a plurality of bearing brackets fixed thereto at longitudinally spaced points and fulcrumed on the cross rod, there being a shield fastened to and covering said bearing brackets and extending substantially the full length of the cutter bar behind the latter, a radius arm fixed to the cross rod under the shield and extending rearwardly away from the cutter bar, another radius arm fixed to the underside of the shield and extending rearwardly over the first arm in angular relation therewith so that the free end thereof is disposed in spaced relation to the free end of the other arm, and means cooperating with the free ends of said arms for adjusting the second arm angularly toward or away from the first arm.

10. A lawn mower as set forth in claim 9 wherein the side frames have openings provided therein and wherein the cross rod has reduced ends extending through said openings and arranged for a certain amount of adjustment therein but only in one plane parallel with the axis of the reel, the shoulders at said reduced ends being arranged to bear against the inside of the side frames, and nuts threading on the reduced ends of said rod arranged to clamp the same in adjusted position.

11. In a lawn mower, the combination with a pair of side frames, a reel mounted in the side frames, and a cutter bar extending between said frames and cooperating with said reel, of a tie bar extending from one side frame to the other, the said tie bar being of large diameter but having the ends thereof reduced and threaded, whereby annular shoulders are formed at the opposite ends thereof, the side frames having holes provided therein arranged to provide a close fit for the reduced ends of said tie bar therein, and nuts threading on the reduced ends of said tie bar arranged when tightened to fasten the side frames to the tie bar so that the inner faces of the side frames bear against the annular shoulders, the tie bar having flat sides at the opposite ends thereof adjacent the annular shoulders to provide bearing surfaces, and the side frames being formed adjacent the holes provided therein to provide complementary bearing surfaces whereby positively to prevent turning of the tie bar relative to either side frame and vice versa, whereby to maintain the cutter bar and reel in proper relation to one another.

12. In a lawn mower, the combination with a pair of side frames, a reel mounted in the side frames, and a cutter bar extending between said frames and cooperating with said reel, of a tie bar extending from one side frame to the other, the said tie bar being of large diameter but having the ends thereof reduced and threaded, whereby annular shoulders are formed at the opposite ends thereof, the side frames having holes provided therein arranged to provide a close fit for the reduced ends of said tie bar therein, and nuts threading on the reduced ends of said tie bar arranged when tightened to fasten the side frames to the tie bar so that the inner faces of the side frames bear against the annular shoulders, said tie bar having the ends thereof adjacent the reduced extremities so formed, and the side frames being provided with recesses, of complementary form adjacent the holes provided therein to receive said reduced extremities, that turning of said bar relative to either side frame is positively prevented and vice versa, whereby the reel and cutter bar are maintained in proper relation to one another.

13. In a lawn mower, the combination with a pair of side frames, a reel mounted in the side frames, and a cutter bar extending between said frames and cooperating with said reel, of a shaft extending from one side frame to the other, said shaft having each end thereof reduced and threaded and formed to provide a tenon portion immediately adjacent the reduced end, the front of the tenon portion constituting a shoulder, and each side frame having a hole provided therein of a size closely to receive the reduced end of the shaft and being formed to provide a recess for snug reception of the tenon, the said shaft having a nut threading on the reduced end thereof arranged when tightened to draw the tenon into the recess and cause the shoulder on the front thereof to bear against the inner face of the side frame whereby to hold the side frame in a plane at right angles to the shaft and also prevent turning of the shaft relative to the frame and vice versa.

14. A lawn mower as set forth in claim 13 wherein said shaft provides a fulcrum support for said cutter bar, the latter having means for adjusting the bar about said shaft as an axis in parallelism with the reel and serving to hold the same in adjusted position and including another shaft in parallel relation to said last mentioned shaft but preferably on the opposite side of the reel therefrom, said shaft likewise having reduced threaded ends with tenons adjacent said ends, and said side frames having holes provided therein to receive said reduced ends and recesses to receive said tenons, there being nuts threading on said ends to fasten the shaft to the side frames.

15. In a lawn mower, the combination with a pair of side frames, and a reel mounted in the side frames, of a tie bar extending from one side frame to the other, the said bar having the ends thereof formed to provide flat-sided tenons and said side frames being formed to provide recesses to receive the tenons whereby to hold the rod against turning relative to the side frames.

16. In a lawn mower, comprising side frames having drive wheels thereon, a reel between said frames adapted to be driven by the wheels, and a shaft bearing the reel and received in bearings provided on and projecting inwardly toward the reel from the side frames, said reel having spiders at opposite ends thereof carrying the blades of said reel, said spiders having circular flanges on the hub portions thereof extending outwardly toward the side frames and substantially covering the shaft bearings on the latter for the purposes herein described, the side frames being provided with circular flanges extending inwardly therefrom toward the reel and approximately concentric with the shaft bearings, said flanges overlapping the outer marginal portions of the circular flanges on the reel spiders substantially as and for the purposes described.

17. A device as set forth in claim 16 wherein said shaft bearings have lubricant receptacles within and covered by the circular flanges of said reel spiders, said flanges having openings provided therein arranged to register with and afford access to said receptacles substantially as and for the purpose described.

18. In a lawn mower, the combination with the frame, the reel and the cutter bar, of means for pivotally supporting the cutter bar on the frame on a longitudinal axis parallel with its longitudinal cutting edge, means for releasably fastening the last mentioned means so that when said fastening means is unfastened both ends of the cutter bar are free and may be adjusted simultaneously by movement bodily of the cutter bar toward the reel to position the cutter bar with its longitudinal axis in a predetermined desired plane, said fastening means when tightened serving to hold the cutter bar in such adjusted position, and means for tilting the cutter bar about its longitudinal axis and holding it in adjusted position.

19. In a lawn mower, the combination with the frame, the reel and the cutter bar, of means for pivotally supporting the cutter bar on the frame on a longitudinal axis parallel with its longitudinal cutting edge, means for releasably fastening the last mentioned means so that when said fastening means is unfastened both ends of the cutter bar are free and may be adjusted substantially vertically at one time by movement bodily of the cutter bar toward the reel to adjust the cutter bar as a whole to position it with its longitudinal axis in a predetermined desired plane, said means when tightened serving to hold the cutter bar in such adjusted position, and means for tilting the cutter bar about its longitudinal axis and holding it in adjusted position.

20. In a lawn mower, the combination with the side frame members and a cutter bar pivotally supported therebetween on a longitudinal axis parallel with the cutting edge thereof, of means directly carrying the cutter bar on the side frame members for adjustment with reference to the latter to position the cutter bar with its longitudinal axis in a predetermined desired plane, said means being arranged to be adjusted solely by movement of the cutter bar, and means for securing the last mentioned means to hold the cutter bar in adjusted position.

21. In a lawn mower, the combination with the frame, the reel operable therein about its longitudinal axis, and the cutter bar, of means for pivotally supporting the cutter bar on the frame on a longitudinal axis parallel with its longitudinal cutting edge, means for releasably fastening the last mentioned means so that when said fastening means is unfastened both ends of the cutter bar are made free to permit bodily adjustment of the cutter bar by movement of it directly toward the reel to position it with its cutting edge aligned end to end with the reel, said means serving when tightened to hold the cutter bar in this coarsely adjusted condition with its longitudinal axis in a plane thus determined, and means for tilting the cutter bar about the longitudinal axis with a fine adjustment to secure the desired accurately adjusted clearance between its cutting edge and the reel and hold it in such adjusted condition.

22. In a lawn mower, the combination with the frame, the reel operable therein about its longitudinal axis, and the cutter bar, of means for pivotally supporting the cutter bar on the frame on a longitudinal axis parallel with its longitudinal cutting edge, means for releasably fastening the last mentioned means so that when said fastening means is unfastened and the lawn mower is inverted from its normal operating position, the cutter bar is free to move bodily by gravity into engagement with the reel for end to end alignment therewith, said means serving when tightened to hold the cutter bar in this coarsely adjusted condition with its longitudinal axis in a plane thus determined, and means for tilting the cutter bar about the longitudinal axis with a fine adjustment to secure the desired accurately adjusted clearance between its cutting edge and the reel and hold it in such adjusted condition.

23. In a lawn mower, the combination with the side frame members and a cutter bar pivotally supported therebetween on a longitudinal axis parallel with the cutting edge thereof, of means directly carrying the cutter bar on the side frame members for adjustment with reference to the latter to position the cutter bar with its longitudinal axis in a predetermined desired plane, said means being arranged to be adjusted by movement of the cutter bar, means for securing the last mentioned means to hold the cutter bar in adjusted position, and means for tilting the cutter bar about its longitudinal axis.

In witness of the foregoing I affix my signature.

WINFIELD S. NICHOLS.

cutter bar about the longitudinal axis with a fine adjustment to secure the desired accurately adjusted clearance between its cutting edge and the reel and hold it in such adjusted condition.

23. In a lawn mower, the combination with the side frame members and a cutter bar pivotally supported therebetween on a longitudinal axis parallel with the cutting edge thereof, of means directly carrying the cutter bar on the side frame members for adjustment with reference to the latter to position the cutter bar with its longitudinal axis in a predetermined desired plane, said means being arranged to be adjusted by movement of the cutter bar, means for securing the last mentioned means to hold the cutter bar in adjusted position, and means for tilting the cutter bar about its longitudinal axis.

In witness of the foregoing I affix my signature.

WINFIELD S. NICHOLS.

CERTIFICATE OF CORRECTION.

Patent No. 1,834,964.   Granted December 8, 1931, to

WINFIELD S. NICHOLS.

It is hereby certified that error appears in the printed specification of the above numbered patent requiring correction as follows: Page 5, line 9, claim 8, strike out the article "the" first occurrence; same page, lines 55 and 81, respectively, claims 11 and 12, for "large" read enlarged; and that the said Letters Patent should be read with these corrections therein that the same may conform to the record of the case in the Patent Office.

Signed and sealed this 9th day of February, A. D. 1932.

(Seal)

M. J. Moore,
Acting Commissioner of Patents.

CERTIFICATE OF CORRECTION.

Patent No. 1,834,964. Granted December 8, 1931, to

WINFIELD S. NICHOLS.

It is hereby certified that error appears in the printed specification of the above numbered patent requiring correction as follows: Page 5, line 9, claim 8, strike out the article "the" first occurrence; same page, lines 55 and 81, respectively, claims 11 and 12, for "large" read enlarged; and that the said Letters Patent should be read with these corrections therein that the same may conform to the record of the case in the Patent Office.

Signed and sealed this 9th day of February, A. D. 1932.

(Seal)

M. J. Moore,
Acting Commissioner of Patents.